United States Patent
Szadkowski et al.

(10) Patent No.: US 7,213,696 B2
(45) Date of Patent: May 8, 2007

(54) FRICTION CLUTCH ARRANGEMENT

(75) Inventors: Andrzej Szadkowski, Rochester Hills, MI (US); Frank von Levern, Auburn Hills, MI (US); Andreas Gebauer, Troy, MI (US)

(73) Assignee: ZF Friedrichshafen AG, Friedrichshafen (DE)

( * ) Notice: Subject to any disclaimer, the term of this patent is extended or adjusted under 35 U.S.C. 154(b) by 188 days.

(21) Appl. No.: 11/010,659

(22) Filed: Dec. 13, 2004

(65) Prior Publication Data

US 2005/0133335 A1    Jun. 23, 2005

(30) Foreign Application Priority Data

Dec. 18, 2003   (DE)   ............................. 103 59 416

(51) Int. Cl.
   *F16D 13/71*   (2006.01)
(52) U.S. Cl. .................................. 192/98; 192/89.24
(58) Field of Classification Search ..................... None
   See application file for complete search history.

(56) References Cited

U.S. PATENT DOCUMENTS

| | | | |
|---|---|---|---|
| 3,741,361 A | 6/1973 | Brandenstein | |
| 5,579,881 A | 12/1996 | Weidinger | |
| 5,715,920 A * | 2/1998 | Lindner et al. | 192/70.25 |
| 5,842,550 A * | 12/1998 | Asada et al. | 192/89.24 |
| 6,029,792 A | 2/2000 | Beitler et al. | |
| 6,176,361 B1 | 1/2001 | Travers et al. | |
| 6,695,116 B2 | 2/2004 | Ziegler et al. | |

FOREIGN PATENT DOCUMENTS

| | | |
|---|---|---|
| DE | 38 06 642 | 9/1989 |
| DE | 40 02 713 | 8/1990 |
| DE | 195 47 559 | 6/1996 |
| DE | 197 08 041 | 9/1998 |

\* cited by examiner

*Primary Examiner*—Saul Rodriguez
(74) *Attorney, Agent, or Firm*—Cohen Pontani Lieberman & Pavane LLP

(57) ABSTRACT

A friction clutch arrangement includes a clutch housing mounted to a flywheel, a pressure plate, a clutch disk mounted on a transmission shaft, and a diaphragm spring which loads the pressure plate toward the flywheel to engage the clutch. A disengagement device includes a sliding sleeve which is axially displaceable on the shaft to introduce a disengagement force to the clutch spring via an force action point, thereby producing a characteristic curve of disengagement force versus disengagement travel of the sleeve. During disengagement, a compensation device introduces a compensation force counter to the pressing force in a predefined section of the characteristic curve, thereby reducing the disengagement force in the predefined section. A switchable force transmission device changes the effective force transmission ratio of the pressing force and the disengagement force during disengagement in a predetermined manner, thereby optimizing the disengagement stroke of the pressure plate.

20 Claims, 3 Drawing Sheets ns
FRICTION CLUTCH ARRANGEMENT

BACKGROUND OF THE INVENTION

1. Field of the Invention

The invention relates to a friction clutch arrangement, in particular for motor vehicles, radially a clutch housing which can be fixed to a flywheel and can rotate about an axis of rotation; at least one pressure plate which is fixed against rotation with respect to the clutch housing and can move axially with respect to the clutch housing; at least one clutch disk which can be fixed against rotation with respect to a shaft, can rotate with respect to the clutch housing, and can engage a respective at least one pressure plate to transmit torque from said clutch housing to the shaft; and a clutch spring arranged on the clutch housing and loading the at least one pressure plate axially toward the flywheel with a pressing force via a first force action point. A disengagement device includes a sliding sleeve mounted concentrically on the shaft, and a first disengagement ring arranged on the sliding sleeve and operatively connected to the clutch spring at a second force action point. The sliding sleeve is axially displaceable on the shaft to introduce a disengagement force to the clutch spring via the second force action point, thereby producing a characteristic curve of disengagement force versus disengagement travel of the sleeve.

2. Description of the Related Art

Friction clutches for motor vehicles are generally known and can be constructed as a pulled or pushed clutch, the pressing force being produced by means of a spring store, for example a diaphragm spring, helical spring or disk spring. In the case of diaphragm springs, there is a special feature that their force-travel characteristic curve has a maximum, which is passed when a clutch is actuated and which, for a driver, results in an undesired alternating load.

The factors of a manually actuated vehicle clutch that determine the driving comfort for a driver and the driving behavior of a vehicle are, firstly, the value of the maximum disengagement force to be applied by the vehicle driver and, secondly, the possible maximum pressure plate disengagement stroke during a disengagement operation, which represents a measure of the separating ability of the clutch. A clutch is usually designed in such a way that the actuating force is not excessively high for an average driver and at the same time, however, secure engagement and disengagement operations can be carried out by him. Incomplete separation of the clutch produces dragging torque on the transmission input shaft, which has a detrimental effect on a subsequent shifting operation. This results in disadvantageous consequences for the lifetime of the system components, in particular the lifetime of the coupling brake in systems with unsynchronized transmissions and of the synchronizing device in synchronous transmissions being reduced.

From the prior art, it is already in principle known that an increase in the pressure plate disengagement stroke proves to be beneficial both for efficient disengagement and for a reduction in the dragging torque when the clutch is actuated.

In the conception of a clutch, with regard to the desired disengagement force and the maximum pressure plate stroke, the problem arises that, as the disengagement force is reduced, the pressure plate disengagement stroke is likewise reduced. On the other hand, if the pressure plate disengagement stroke is increased, the disengagement force is likewise increased. By contrast, however, the smallest possible disengagement force with, at the same time, a long disengagement stroke would be desirable for a vehicle driver during clutch actuation.

SUMMARY OF THE INVENTION

The invention is therefore based on the object of providing a friction clutch arrangement and a method for its actuation which permits easier operation with a long disengagement stroke.

According to the invention, the friction clutch arrangement further includes a compensation device which, during disengagement of the clutch, introduces a compensation force counter to the pressing force in a predefined section of the characteristic curve, thereby reducing the disengagement force in the predefined section. The arrangement also includes a switchable force transmission device which, during disengagement of the clutch, changes the effective force transmission ratio of the pressing force and the disengagement force in a predetermined manner.

As a result of the provision of a compensation device, during the actuation of the friction clutch, at least for some time, that is to say for a specific section of the actuating travel, a compensation force counteracting the pressing force can be produced, as a result of which the pressing force to be applied, for example by a driver of a motor vehicle via a clutch pedal, can be reduced. For this purpose, a simultaneous increase in the disengagement travel is accepted, the lower loading of the pedal foot being more important to the driver, however.

The formation of a multistage force transmission device on a friction clutch arrangement has the advantage that the disengagement work to be expended during a clutch actuation, for example by a driver of a motor vehicle via a clutch pedal, can in principle be adapted constructionally as desired to the benefit of either the disengagement force or the disengagement travel. For example, it is possible to implement a relatively small disengagement force with a relatively long disengagement travel or a relatively high disengagement force with a relatively short disengagement travel, as predefined. In addition, during a disengagement operation, by changing the transmission stage, a transmission ratio which is beneficial to the respective actuating section can be set.

A friction clutch arrangement having a compensation device and a multistage force transmission device may be actuated with particular advantage if, during a disengagement operation, in a first step, the compensation device is activated in order to reduce the disengagement force and, in a second step, using the force transmission device, an effective force transmission ratio is changed in order to increase the disengagement force. By means of the combination of these steps, for example in the case of a friction clutch with a diaphragm spring, the pronounced force maximum in its force-travel characteristic curve can be circumvented extremely cleverly in that, in the region of the maximum, by means of the compensation device, the actuating force is initially reduced and then, in a falling region of the force-travel characteristic curve of the diaphragm spring, the disengagement force is increased again by a change in the force transmission device to a value which is acceptable to the vehicle driver, the associated disengagement travel being shortened at the same time. This means that, in various sections of the force-travel characteristic curve of a diaphragm spring, the method permits the respectively acting different disengagement forces to be equated somewhat in terms of their magnitude in that, as compared with a known friction clutch, the disengagement force is reduced in one actuating section and is increased in another actuating section. For a driver of a motor vehicle, the previously pronounced alternating loading is dispensed with and the force can be applied more harmoniously and therefore more acceptably.

Given appropriate design, with the aid of the invention on a friction clutch, with a reduction in the disengagement force, at the same time a longer disengagement stroke can consequently also be implemented, as a result of which coupling wear as a result of an incomplete separation operation is reliably avoided.

The friction clutch arrangements according to the invention and the method according to the invention are not restricted to specific clutch types. These can be applied flexibly, for example in the case of single-disk and multi-disk clutches, in the case of diaphragm spring, disk spring and helical spring clutches, in clutches with and without coupling forks and in the case of dry or wet clutches.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
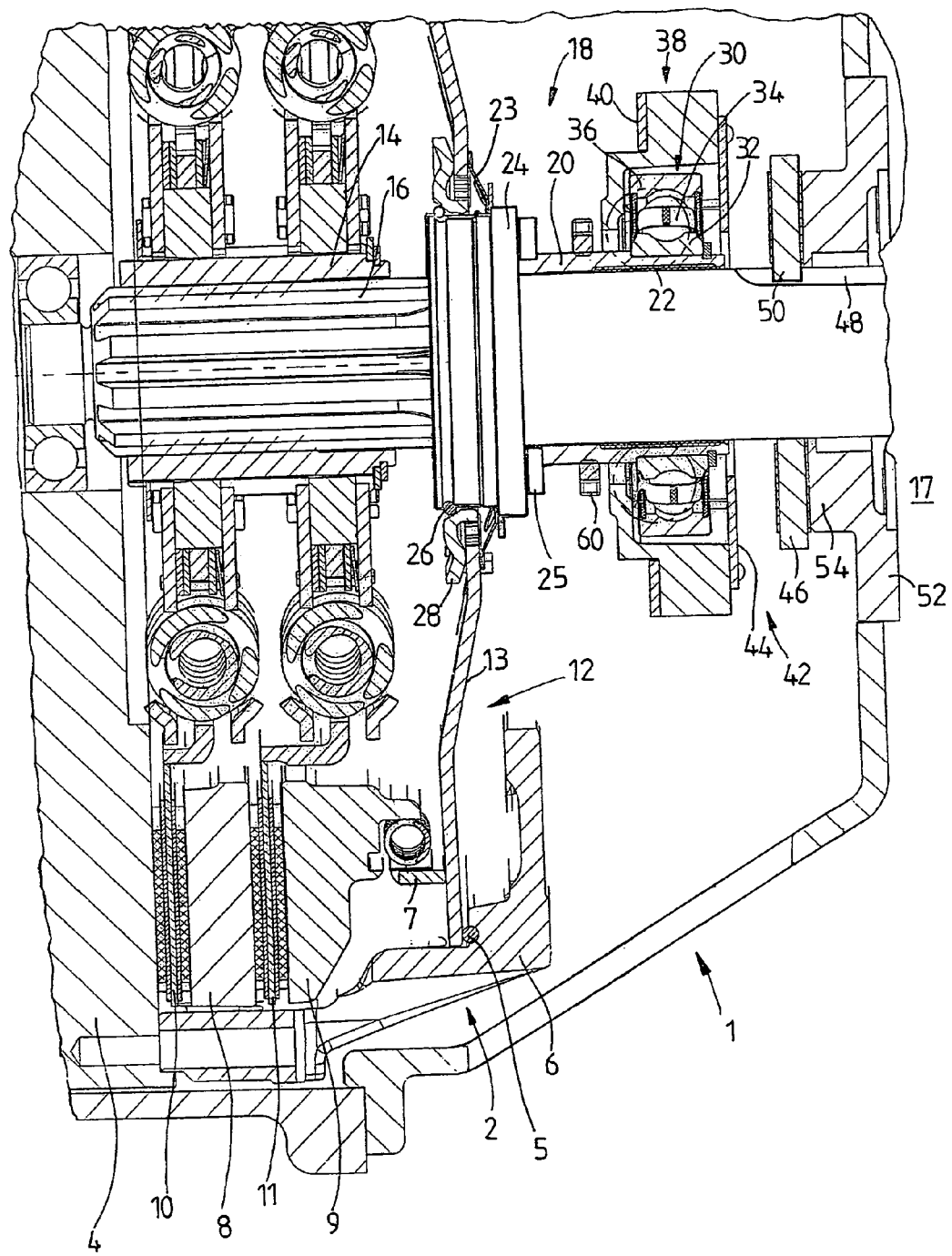
FIG. 1 shows an axial sectional illustration of a previously known friction clutch arrangement with two clutch disks, a diaphragm spring and a disengagement device.

FIG. 1 illustrates a friction clutch arrangement 1 with a friction clutch 2 of pulled design, which comprises a flywheel 4 which is firmly connected to a clutch housing 6. Arranged between the flywheel 4 and the clutch housing 6 are two pressure plates 8, 9, which are loaded in the direction of the flywheel 4 by a diaphragm spring 12. Clamped in between the pressure plates 8, 9 and the flywheel 4 are two clutch disks 10, 11 which, via a hub 14, are firmly connected to an input shaft 16, only partly illustrated, of a following speed-change transmission 17 so as to rotate with this shaft but to be axially displaceable. The pressure plates 8, 9 are firmly connected to the clutch housing 6 in the circumferential direction, but mounted such that they can be displaced in the axial direction. The diaphragm spring 12 is supported on the clutch housing 6 on its outer circumference by means of a ring element 5 and produces the operative connection to the pressure plate 9 via a web take-off 7 located further radially inward, which defines a force action point. The diaphragm spring 12 reaches with its spring tongues 13 radially inward for actuation by a disengagement device 18. The diaphragm spring 12 thus firstly produces a pressing force on the pressure plates 8, 9 and, at the same time, represents a lever arrangement which can be pivoted about the ring element 5 for a force transmission device.

The disengagement device 18 for actuating the motor vehicle friction clutch 2 firstly comprises a sliding sleeve 20 which is arranged concentrically around the transmission input shaft 16, which, at the same time, represents the clutch output shaft. The inner circumference of the sliding sleeve 20 is provided over part of its axial length with a bush 22, by which the sliding sleeve 20 is mounted and guided in a sliding manner on the transmission input shaft 16. The end of the sliding sleeve 20 on the clutch side bears a setting ring 24 which produces the operative connection to the diaphragm spring tongues 13 via a load ring 26 and a disengagement ring 28. The diaphragm spring tongues 13 are held in contact with the disengagement ring 28 by a disk spring 23 supported on a ledge on the setting ring 24. At its end on the transmission side, the sliding sleeve 20 carries a disengagement bearing 30 with an inner ring 32 revolving with the sleeve, balls 34 and an outer ring 36 which is rotatable relative to the inner ring. The disengagement bearing 30 is surrounded by a bearing housing 38, which has a flanged region 40 as a contact surface for an actuating element, not illustrated in the drawing, for carrying out a disengagement movement of the friction clutch 2. The bearing housing 38 is in this case firmly connected to the outer ring 36. The disengagement device 18 further comprises a braking device 42 having a first braking element 44 which is arranged on the bearing housing 38 so as to be fixed in relation to the outer ring 36 and which can be brought into braking interaction with a brake disk 46 firmly connected to the transmission input shaft so as to rotate with it but to be axially displaceable. For this purpose, the transmission input shaft 16 is provided with at least one groove 48, in which the brake disk 46 engages with a corresponding lug 50. The braking element 44 on the bearing housing 38 acts as a pressure plate during a disengagement movement of the disengagement device 18 and presses the brake disk 46 against an axial projection 54 formed on the transmission housing 52, which produces specific braking of the transmission input shaft 16.

For the precise setting of a braking movement coordinated in time with the clutch actuation, the position of the setting ring 24 on the sleeve 20 can be adjusted. For this purpose, the sliding sleeve 20 has an external thread, not illustrated in the drawing in FIG. 1, axially in the region of the setting ring, and the setting ring 24 has a corresponding internal thread. For the purpose of axial adjustment of the setting ring 24, a hook wrench (not illustrated) engages around a grooved nut 60 arranged firmly on the sliding sleeve 20 then rotates it into or out of the plane of the drawing, at the same time a hook wrench acting on the setting ring 24 securing the setting ring 24 against corotation. The position of the setting ring 24 can then be fixed by being locked by means of a further grooved nut 25.

Figure 2:
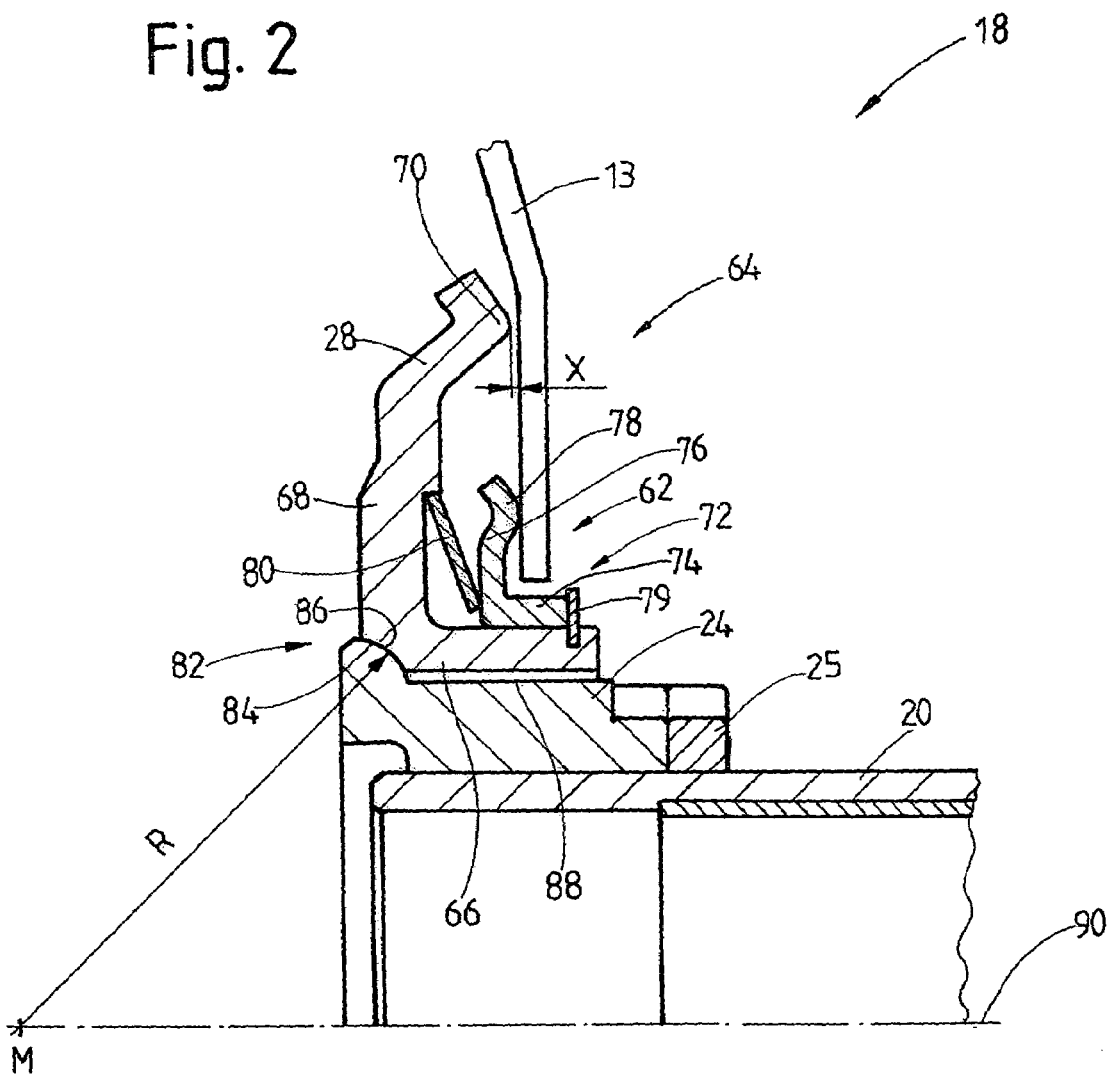
FIG. 2 shows a disengagement device having a compensation device and multistage force transmission device.

FIG. 2 shows a modified disengagement device 18 in the engaged state of the clutch 2 according to the invention, having a compensation device 62 and a two-stage switchable force transmission device 64, which is arranged on the friction clutch arrangement 1 instead of the disengagement device 18 illustrated in FIG. 1. The disengagement device 18 firstly comprises a first disengagement ring 72 which, in the axial section of FIG. 2, is formed angularly with a leg 74 running axially and a leg 76 running substantially radially outward. Formed on the outer region of the leg 76 is an axial projection 78 which points toward the diaphragm spring tongue 13 and which, in the state illustrated, represents the sole contact surface for the diaphragm spring tongue 13.

Furthermore, the disengagement device 18 comprises a second disengagement ring 28 which, on the setting ring, assumes the position of the disengagement ring 28 in the example illustrated in FIG. 1. This second disengagement ring 28 also has an angular cross section with a leg 66 running axially and a leg 68 running substantially radially outward and provided with an axial projection 70 pointing toward the diaphragm spring tongue 13. This axial projection 70 represents a second contact surface for the diaphragm spring tongue 13, which comes into contact with this projection only during the course of a disengagement operation. In the engaged state of the clutch 2, as shown, the tongue 13 is at a distance X from the projection 70. The first disengagement ring 72 is mounted on the leg 66 such that it can be displaced axially between a securing element 79 arranged on the latter and a disk spring 80 supported on the leg 68. The disk spring 80 constitutes a compensation spring belonging to the compensation device 62, while the contact surfaces 70, 78 form two force action points of the force transmission device 64 which are located in a different radial and axial position and whose mode of action will be described in more detail below. For improved clarity, the spring 23 (FIG. 1) has not been shown in FIG. 2. The spring 23 is designed in such a way that it has no influence or no substantial influence on the function described below of the friction clutch arrangement.

The disengagement device further comprises a device 82 to compensate for a wobbling movement, spherical surfaces 84, 86 in sliding contact with one another with a common center located on the clutch axis of rotation within the clutch 2 being shaped on the end of the sliding sleeve 20 oriented toward the clutch 2 and on the second disengagement ring 28. Between the outer circumferential surface of the setting ring 24 and the inner circumferential surface of the disengagement ring 28 there is an annular gap 88 which, in the event of a wobbling movement introduced via a crankshaft of an internal combustion engine, provides space for the disengagement ring 28 to pivot and thus avoids transmission of the wobbling movement to the setting ring 24.

Figure 3:
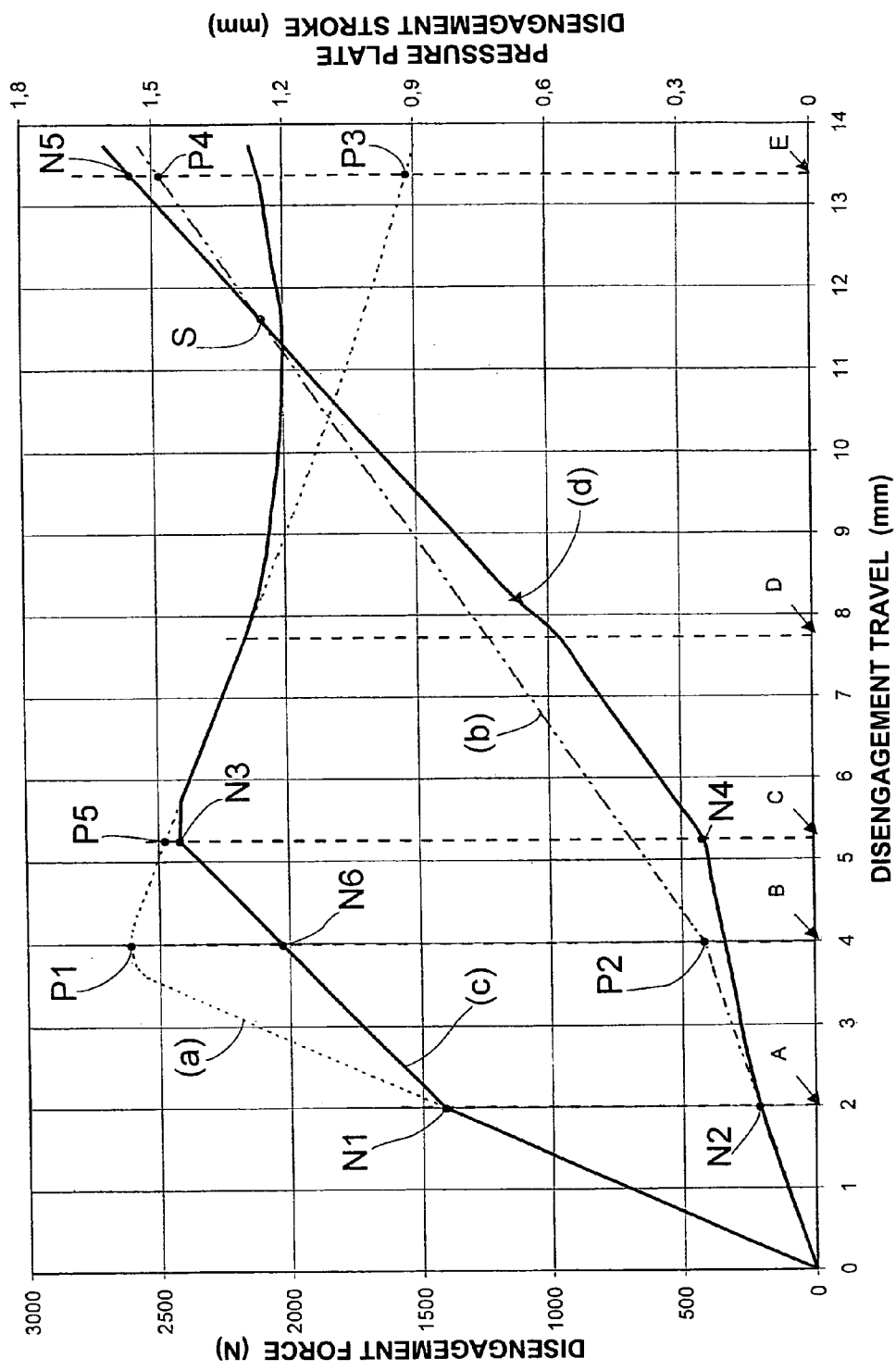
FIG. 3 is a plot of the disengagement force and of the pressure plate disengagement stroke over the disengagement travel of a clutch known from the prior art as compared with that according to the invention.

In the following text, the function of the friction clutch arrangement 1 will be explained in more detail. For this purpose, in FIG. 3, first of all the curves (a) describe the course of the disengagement force and (b) the course of the pressure plate disengagement stroke of a clutch known from the prior art. When this clutch is actuated, as the passage of the disengagement travel 0B is covered, first of all the disengagement force rises from 0 as far as a maximum value P1, while the pressing force, not illustrated, falls from its maximum value to 0 and the disengagement stroke takes place approximately linearly from 0 as far as a value P2. The movement of the disengaging means is primarily determined in this phase by the elastic deformation of the spring tongues 13 and additionally by inaccuracies in the clutch system.

In the further course, beginning at B, the disengagement force and the disengagement stroke are determined by the approximately constant force transmission ratio, that is to say by the lever ratio of the diaphragm spring. In the region BE, the disengagement force falls from the value P1 as far as a value P3, while the disengagement stroke rises approximately linearly from the value P2 to the value P4.

The curve (c) describes the course of the disengagement force and (d) the course of the pressure plate disengagement stroke of a clutch arrangement according to the present invention.

In the engaged state, the diaphragm spring tongue 13 initially bears on the contact surface 78. When, during a disengagement operation, the sliding sleeve 20 is moved to the right in FIG. 2, then, in the region 0A, the course of the disengagement force then as far as a value N1 and the disengagement stroke achieved in the process as far as a value N2 correspond to those of the previously known clutch, the diaphragm spring tongues 13 initially being elastically deformed. The disk spring 80 is designed in such a way that it is not deformed in the section 0A under the action of the force of the diaphragm spring tongues, which means that the first disengagement ring 72 remains fixed in its position on the second disengagement ring 28.

As the clutch is disengaged further, in the region AC the disengagement force (c) rises further but more slowly and, at the position C, reaches its maximum value N3, which is considerably smaller as compared with the maximum value P1 of the curve (a) but, at the position C, virtually coincides with the value P5 for the course (a). At the same time, the disengagement stroke increases to the value N4, with which, in the region AC, the latter remains considerably below that of the curve (b).

It is important that the maximum in the force-travel course (a), which is brought about by the characteristic curve of the diaphragm spring 12, occurs in a substantially attenuated form in the curve (c). In the region AC, the course just described of the curves (c) and (d) is brought about by a rise in the force acting on the contact surface 78 from the diaphragm spring 12, which can no longer support the disk spring 80, which has been stiff up to this point, and whereupon the disk spring 80 increasingly deforms elastically. In the process, the first disengagement ring 72 carries out a sliding movement on the second disengagement ring 28, the distance X also being reduced at the same time. This means that the disk spring 80 functions in this section of the actuating travel as a compensation spring which, at least for some time, produces a compensation force opposed to the diaphragm spring 12 and therefore reduces the force maximum P1 of the diaphragm spring 12 to a value N6 at the point B. This force compensation is carried out in this case to the benefit of the pressure plate disengagement stroke, which becomes visible from a comparison of the curves (b) and (d). From the increasingly divergent course of the curves (a) and (c) in the region AB, it can be seen that the compensation force is increased in the event of a rise in the diaphragm spring force. The distance X in FIG. 2 is chosen such that the diaphragm spring tongue 13 does not yet come into contact with the contact surface 70 when the position C is reached. This takes place only in the still further displacement course, at the position D. The curve (c) therefore describes, in the region AD, the superimposition of the diaphragm spring characteristic curve on that of the disk spring 80.

After the maximum at the position C has been exceeded, the disengagement force falls again until the position D is reached, running coincidently with the curve (a), and the stroke (d) rises somewhat with the same gain as (b).

When the position D is reached, the diaphragm spring tongue 13 comes into contact with the surface 70, as a result of which the force action point on the diaphragm spring tongue 13 is displaced radially further outward with respect to the axis of rotation 90 of the clutch arrangement 1 and the length of the lever arm of the diaphragm spring 20 with respect to the pivot 5 is shortened. As a result of this measure, therefore, in the region DE, the transmission ratio between pressing force and disengagement force on the diaphragm spring 12 changes. In the present case, by means of the shortening of the lever arm acting on the disengagement device, the disengagement force acting there is increased, which is reflected in an approximately linear rise, steep as compared with the curve (b), of the disengagement stroke (d) and a disengagement force (c) running above (a). The course of the pressure plate disengagement stroke (b), (d) within the region DE has a point of intersection S, so that, in the end position E, a greater maximum disengagement stroke N5 can be implemented with the clutch device according to the invention as compared with the conventional clutch.

As an alternative to the exemplary embodiment described, the compensation device and/or the switchable force transmission device can also be implemented at a different position on the friction clutch arrangement. For example, it is conceivable to implement both or at least one of the devices in the clutch housing and the other device on the disengagement means.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A friction clutch arrangement for a motor vehicle, said arrangement comprising:
   a clutch housing which can be fixed to a flywheel and can rotate about an axis of rotation;
   at least one pressure plate which is fixed against rotation with respect to said clutch housing and can move axially with respect to said clutch housing;
   at least one clutch disk which can be fixed against rotation with respect to a shaft, can rotate with respect to said clutch housing, and can engage a respective at least one pressure plate to transmit torque from said clutch housing to said shaft;
   a clutch spring arranged on said clutch housing and loading said at least one pressure plate axially toward said flywheel with a pressing force via a first force action point;
   a disengagement device comprising a sliding sleeve which is mounted concentrically on said shaft, and a first disengagement ring arranged on said sliding sleeve and operatively connected to said clutch spring at a second force action point, said sliding sleeve being axially displaceable on said shaft to introduce a disengagement force to said clutch spring via said second force action point, thereby producing a characteristic curve of disengagement force versus disengagement travel of said sleeve; and
   a compensation device which, during disengagement of said clutch, introduces a compensation force counter to said pressing force in a predefined section of said characteristic curve, thereby reducing said disengagement force in said predefined section, wherein said compensation device comprises a compensation spring arranged in a force transmission path between the clutch spring and the sliding sleeve.

2. The friction clutch arrangement of claim 1 wherein the disengagement force and the pressing force have a force transmission ratio, said arrangement further comprising a switchable force transmission device which, during disengagement of the clutch, changes the effective force transmission ratio in a predetermined manner.

3. The friction clutch arrangement of claim 2 wherein at least one of said compensation device and said switchable force transmission device forms part of said disengagement device.

4. The friction clutch arrangement of claim 3 wherein the switchable force transmission device comprises a third force action point which, during disengagement of the clutch, is operatively connected to the clutch spring in order to change the force transmission ratio.

5. The friction clutch arrangement of claim 1 wherein the clutch spring is a diaphragm spring having a plurality of radially oriented spring tongues which act on said first disengagement ring via said second force action point.

6. The friction clutch arrangement of claim 1 wherein the compensation force increases in response to an increase in the disengagement force.

7. The friction clutch arrangement of claim 1 further comprising two stops which are axially substantially fixed with respect to said sliding sleeve, said first disengagement ring being axially displaceable between said stops counter to the action of the compensation spring.

8. The friction clutch arrangement of claim 7 wherein the compensation spring is a disk spring which is supported axially between said first disengagement ring and one of said stops.

9. The friction clutch arrangement of claim 2 wherein the disengagement device further comprises a third force action point which can be operatively connected to said clutch spring, said switchable force transmission device comprising means for bringing said third force action point into operative engagement with said clutch spring, thereby changing the effective force transmission ratio.

10. The friction clutch arrangement of claim 9 wherein said second and third force action points have different radial positions with respect to the axis of rotation.

11. The friction clutch arrangement of claim 10 wherein said third force action point can move axially relative to said second force action point.

12. The friction clutch arrangement of claim 11 wherein the disengagement device further comprises a second disengagement ring on which said third force action point is located, said first disengagement ring being arranged on said second disengagement ring, said compensation device comprising a compensation spring arranged on said second disengagement ring and acting on said first disengagement ring.

13. The friction clutch arrangement of claim 12 further comprising a device for compensating for wobbling of the housing relative to the shaft.

14. The friction clutch arrangement of claim 13 wherein said device for compensating for wobbling comprises a convex spherical surface in sliding contact with a concave spherical surface, said spherical surfaces having a common center on the axis of rotation.

15. The friction clutch arrangement of claim 14 further comprising a setting ring fixed to said sleeve, said setting ring having said convex spherical surface, said convex spherical surface being formed on said second disengagement ring.

16. The friction clutch arrangement of claim 1 wherein said clutch spring is pulled to disengage said clutch disk from said pressure plate.

17. The friction clutch arrangement of claim 1 wherein said first disengagement ring is preloaded toward said clutch spring by said compensation device, whereby said predefined section of said characteristic curve commences after initial displacement of said sliding sleeve.

18. The friction clutch arrangement of claim 10 wherein the bringing of said third force action point into operative engagement with said clutch spring increases the axial displacement of the pressure plate.

19. The friction clutch arrangement of claim 1 wherein said predefined section of said characteristic curve begins substantially after said sleeve has commenced disengagement travel in response to said disengagement force.

20. The friction clutch arrangement of claim 19 wherein, during an initial part of said predefined section, said disengagement force rises more slowly than said disengagement force would rise without said compensation.

* * * * *